United States Patent
Richards et al.

(10) Patent No.: US 10,049,501 B1
(45) Date of Patent: Aug. 14, 2018

(54) CROSSTALK MITIGATION FOR VIRTUAL REALITY

(71) Applicant: Oculus VR, LLC, Menlo Park, CA (US)

(72) Inventors: Evan M. Richards, Santa Clara, CA (US); Nirav Rajendra Patel, San Francisco, CA (US)

(73) Assignee: Oculus VR, LLC, Menlo Park, CA (US)

( * ) Notice: Subject to any disclaimer, the term of this patent is extended or adjusted under 35 U.S.C. 154(b) by 158 days.

(21) Appl. No.: 15/294,318

(22) Filed: Oct. 14, 2016

(51) Int. Cl.
 G09G 5/02 (2006.01)
 G06T 19/00 (2011.01)
 G06F 3/01 (2006.01)

(52) U.S. Cl.
 CPC ............ *G06T 19/006* (2013.01); *G06F 3/012* (2013.01)

(58) Field of Classification Search
 CPC ............ G02B 27/0018; G02B 27/0172; G02B 5/003; G02B 6/00; G02B 1/11; G02B 2027/012; G02B 2027/0138; G02B 2027/0178; G02B 6/0016; G06F 3/011
 See application file for complete search history.

(56) References Cited

U.S. PATENT DOCUMENTS

| 2015/0260988 A1* | 9/2015 | Sugihara | G02B 27/0101 |
| | | | 359/630 |
| 2017/0227686 A1* | 8/2017 | Price | G02B 5/003 |

\* cited by examiner

*Primary Examiner* — Nelson Rosario
(74) *Attorney, Agent, or Firm* — Fenwick & West LLP (57) ABSTRACT

A head mounted display (HMD) comprises a display panel with a first portion including an active area, and a second portion electrically coupled to the first portion of the display panel. The display panel is configured to receive content and compensation content from a VR console for driving the first portion and the second portion of the display panel, respectively. The compensation content is based on modification of the content to be displayed on the first portion of the display panel to mitigate crosstalk in the first portion of the display panel.

13 Claims, 6 Drawing Sheets

Actual

Desired

CROSSTALK MITIGATION FOR VIRTUAL REALITY

BACKGROUND

The present disclosure generally relates to enhancing an active-matrix organic light-emitting diode (AMOLED) display for use in a virtual reality (VR), mixed reality (MR), or augmented reality (AR) system. VR, MR, and AR systems require display panels with high resolutions. As AMOLED displays increase in resolution, crosstalk may become an issue as crosstalk limits the uniformity of display.

SUMMARY

A HMD (head-mounted display) comprises a display panel with a first portion including an active area of the display panel and a second portion of the display panel electrically coupled to the first portion of the display panel. The display panel is configured to receive content and compensation content from a VR console for driving the first portion and the second portion of the display panel, respectively. The VR console is configured to generate compensation content for the second portion of the display panel, wherein the compensation content is based on modification of the content to be displayed on the first portion of the display panel to mitigate crosstalk in the first portion of the display panel. The VR console is also configured to provide the content and the compensation content for driving the first portion and the second portion of the display panel, respectively, to the display panel of the HMD.

In one embodiment, the HMD further comprises a blocking object to prevent light generated from the second portion of the display panel from reaching an eye of a user wearing the HMD. In another embodiment, the second portion of the display panel comprises a plurality of electronic circuit elements to drive a plurality of pixels in the second portion of the display panel that do not emit light. In still another embodiment, the second portion of the display panel comprises aggregate electronic circuit elements to simulate a plurality of electronic circuit elements to drive a plurality of pixels in the second portion of the display panel that do not emit light, wherein each one of the aggregate electronic circuit elements is configured to drive a corresponding row or column of the plurality of pixels in the second portion of the display area.

In one embodiment, the VR console may be configured to generate the compensation content by inverting the luminance corresponding to each row or column of the content to be displayed on the first portion of the display panel. In another embodiment, the VR console may be configured to generate the compensation content by summing a luminance of each row or column of the content to be displayed on the first portion of the display panel and inverting the sum of the luminance.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
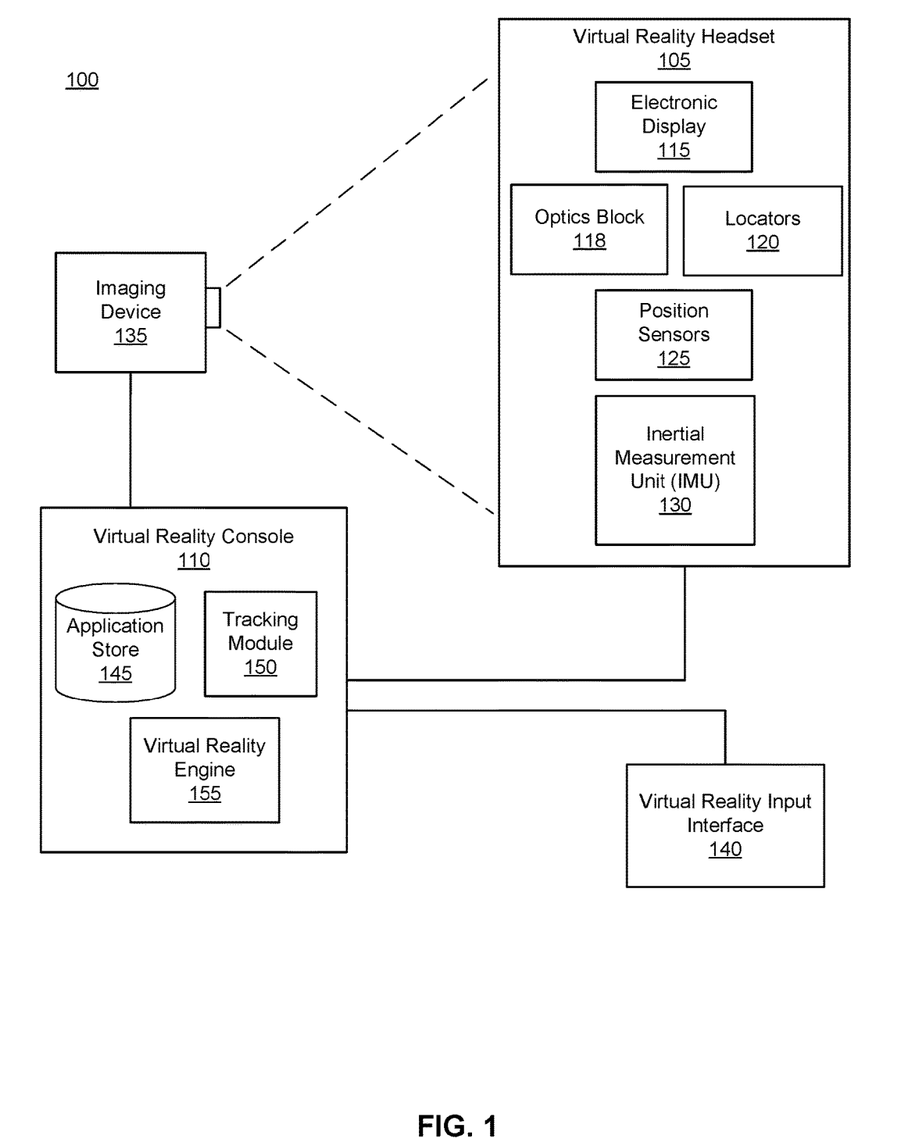
FIG. 1 is a block diagram of a system environment including a VR system, in accordance with an embodiment.

FIG. 1 is a block diagram of a VR system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display (HMD) that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., an electronic display for each eye of a user).

An electronic display 115 may be a liquid crystal display (LCD), an organic light emitting diode (OLED) display, an active-matrix organic light-emitting diode (AMOLED) display, a transparent organic light emitting diode (TOLED) display, some other display, or some combination thereof.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
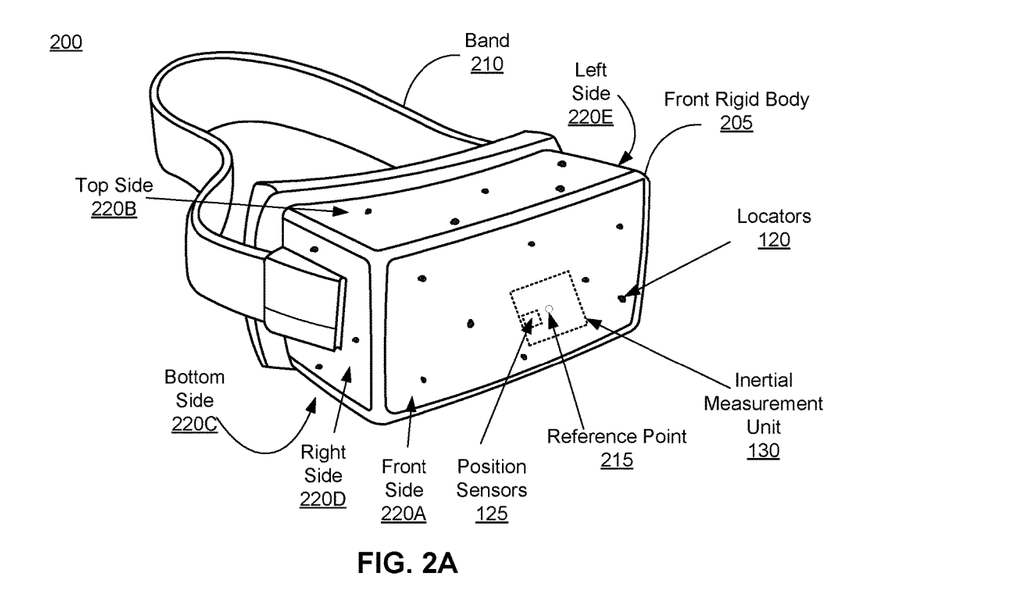
FIG. 2A is a diagram of a VR headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes an electronic display 115, the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
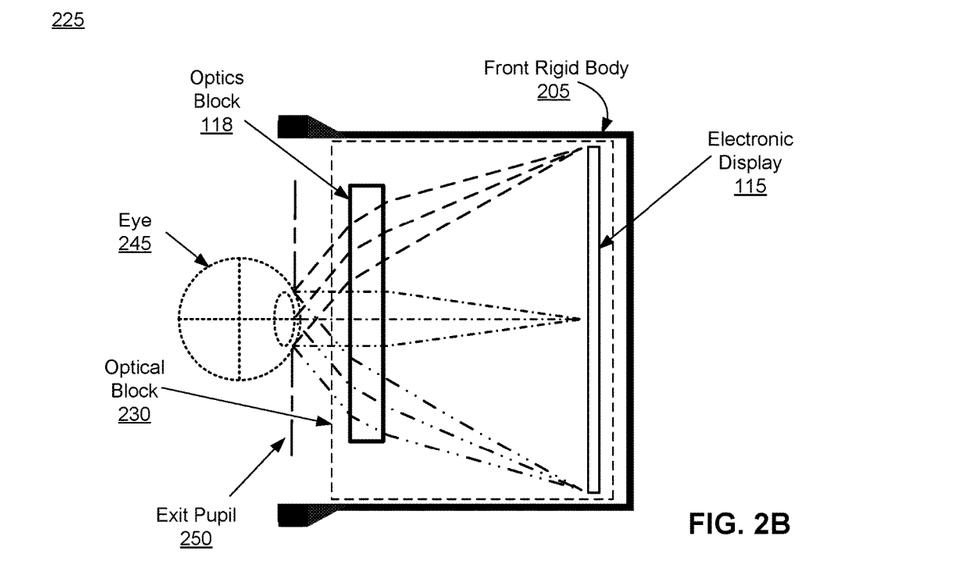
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display 115, and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Crosstalk in Displays

Figure 3:
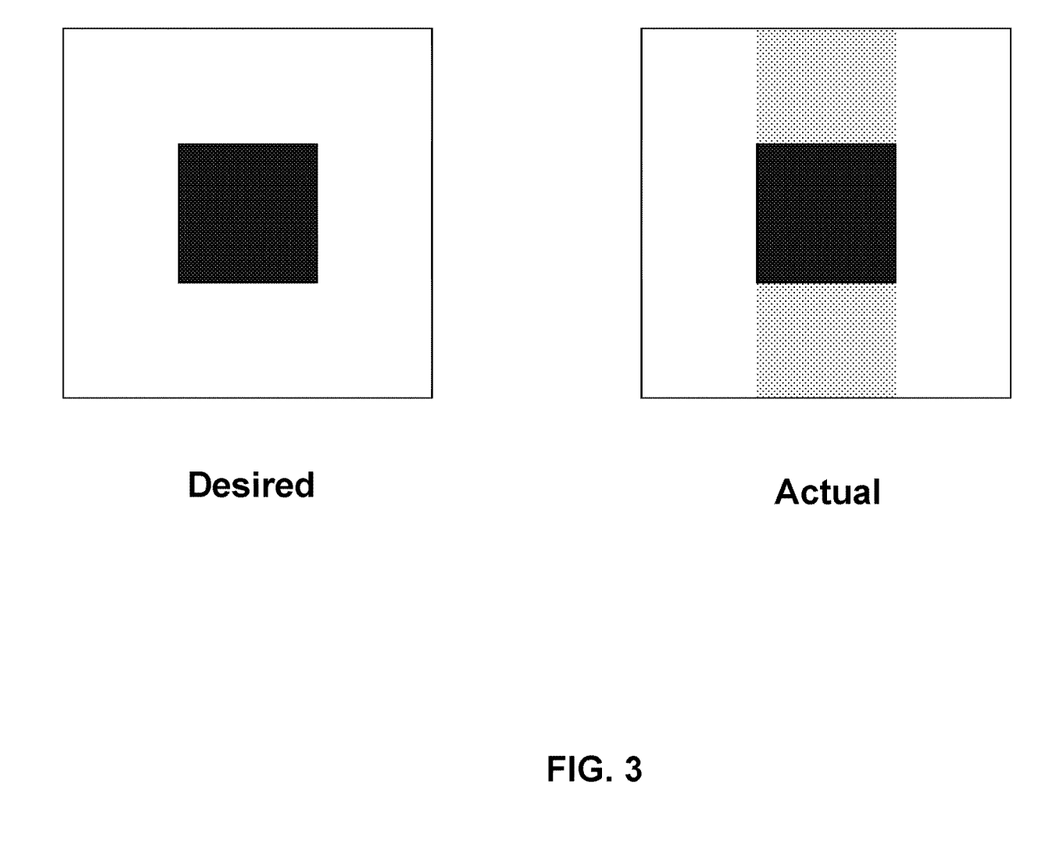
FIG. 3 is a diagram illustrating the problem with crosstalk for a display panel.

FIG. 3 illustrates an example of the problem with crosstalk for a display panel. For example, the electronic display 115 of a VR headset 105 (HMD) is a display panel which may have driver ICs that drive columns of the display, and crosstalk may occur in the column direction of the panel. The desired image to be displayed on the display panel of the HMD may be a dark or black square in the center of a white background. The actual image displayed may be the dark or black square in the center but adjacent pixels for displaying the white background in the same columns that include pixels for displaying the black square may be dimmer than pixels in columns that do not include pixels for displaying the black square. Although FIG. 3 depicts this crosstalk or dimming of the white background occurring in a column direction, the crosstalk may occur in a row direction.

Display Panel for Mitigating Crosstalk in a HMD

Figure 4A:
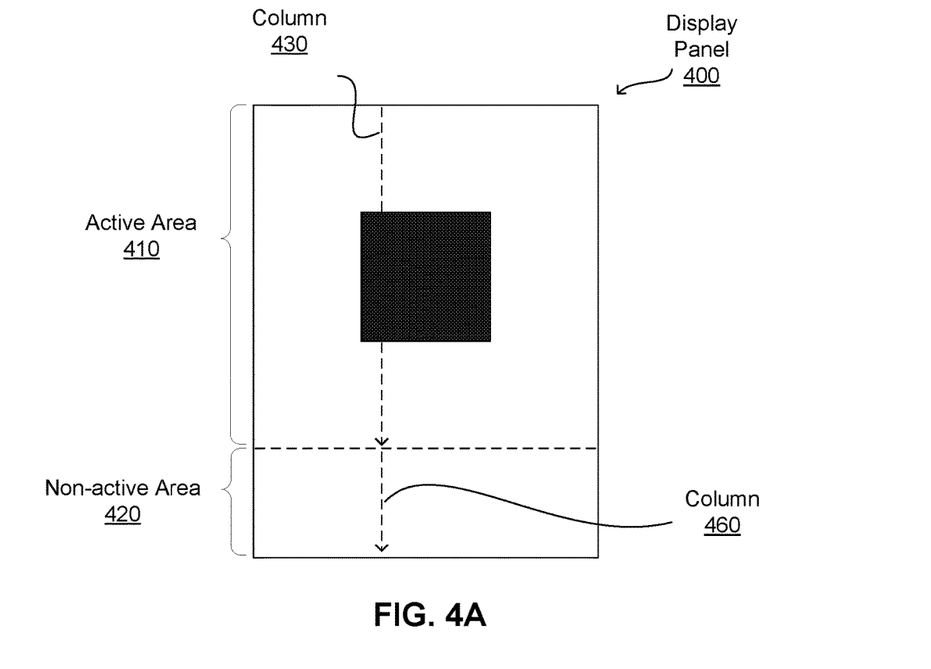
FIG. 4A is a diagram illustrating a display panel with an active area and a non-active area to mitigate crosstalk in accordance with an embodiment.

FIG. 4A shows a display panel 400 with an active area 410 and a non-active area 420 for mitigating crosstalk, in accordance to an embodiment. For example, the electronic display 115 of a VR headset 105 (HMD) is a display panel 400 for mitigating crosstalk. The display panel 400 may be an AMOLED display. The display panel includes an active area 410 (first portion of the display panel) and a non-active area 420 (second portion of the display panel). The active area 410 is electrically coupled to the non-active area 420. For example, FIG. 4A depicts an embodiment in which the active area 410 is located vertically above the non-active area 420, and the active area 410 is electrically coupled to the non-active area 420 in a column direction. Alternatively, the active area 410 may be horizontally adjacent to the non-active area 420 (although not shown) and may be electrically coupled in a row direction. In one embodiment, the non-active area 420 is similar to the active area 410 of the display panel except the pixels in the non-active area 420 are obscured from the view of the user. For example, the HMD may further comprise a blocking object to prevent light generated from the second portion of the display panel from reaching an eye of a user wearing the HMD. In one embodiment, the pixels in the non-active area 420 may be overdriven to compensate for a smaller number of pixels in the non-active area 420 compared to the number of pixels in the active area 410. In another embodiment, the non-active area 420 includes electronic circuit elements to drive a plurality of pixels in the non-active area 420 that do not emit light. For example, the non-active area 420 may be similar to the active area 410 except the light emitting element in each pixel (e.g., OLED) of the non-active area 420 may be replaced by a diode or other electronic element that does not emit light. In still another embodiment, the non-active area 420 includes aggregate electronic circuit elements to simulate a plurality of electronic circuit elements to drive a plurality of pixels in the non-active area 420 of the display panel that do not emit light. Each one of the aggregate electronic circuit elements may be configured to drive a corresponding column of the plurality of pixels in the non-active area 420. Alternatively, each one of the aggregate electronic circuit elements may be configured to drive a corresponding row of the plurality of pixels in the non-active area 420.

The display panel 400 is configured to receive content for driving the active area 410 and compensation content for driving the non-active area 420. The VR console 110 generates compensation content for the non-active area 420 based on the content to be displayed on the active area 410 to mitigate crosstalk in the active area 410 of the display panel. In one embodiment, the VR console 110 may generate the compensation content by inverting the luminance corresponding to each column of the content to be displayed on the active area 410. The compensation content of the non-active area 420 may be based on the inverted luminance of a corresponding column in the active area 410. In another embodiment, the VR console 110 may generate the compensation content by summing the luminance of each column of the content to be displayed on the active area 410 and inverting the sum. The compensation content of the non-active area 420 may be based on the inverted sum of the luminance of a corresponding column in the active area 410.

Figure 4B:
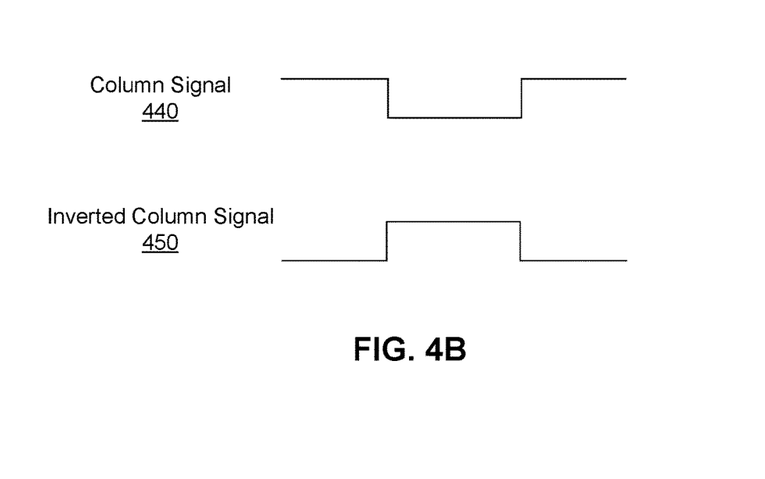
FIG. 4B depicts a column of content signal of the active area and an inverted column signal of the non-active area of the display panel.

FIG. 4B depicts a column of content signal 440 of the active area 410 and an inverted column signal 450 of the content signal 440. Column signal 440 depicts an image signal along column 430 of the active area 410 of the display panel 400. The column signal 440 is at a high level luminance for the pixels in the column 430 corresponding to the white background and at a low level luminance for pixels in the column 430 corresponding to the black square. The VR console 110 of the HMD may invert the column signal 440 to produce an inverted column signal 450. The inverted column signal 450 is at a low level luminance for column pixels corresponding to the white background and at a high level luminance for the column pixels corresponding to the black square. To correct for the crosstalk that may occur in a column 430 driven with the column signal 440, the VR console 110 provides the display panel 400 of the HMD with compensation content to drive a column 460 of the non-active area 420 in the same column 430 of active area 410 of the display panel 400. The compensation content may be based on the inverted column signal 450. For example, the compensation content for column 460 may be the inverted column signal 450, a portion of the inverted column signal 450, a scaled version of the inverted column signal 450 or some combination thereof. In another embodiment, the VR console 110 may generate the compensation content for column 460 by summing the luminance of the content to be displayed in column 430 of the active area 410 and inverting the sum. For example, the compensation content for column 460 may be the inverted sum of the luminance or a scaled version of the inverted sum of the luminance.

Figure 4C:
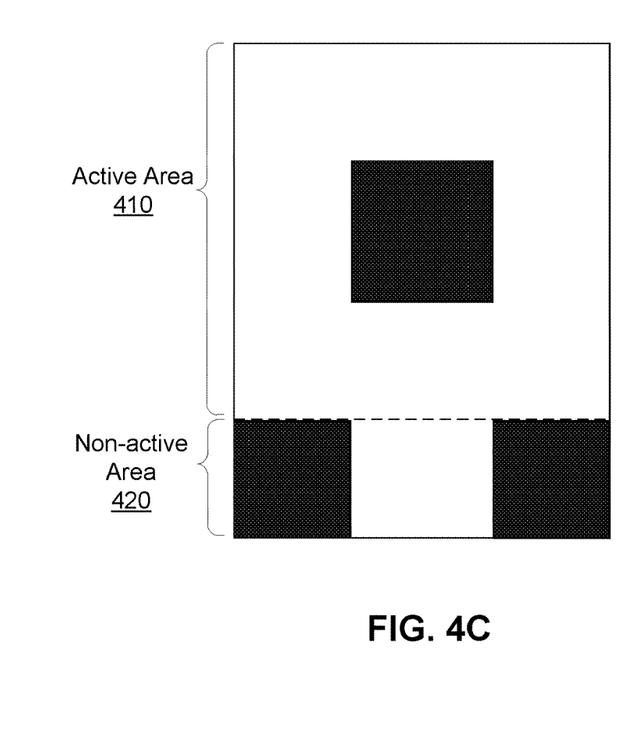
FIG. 4C is a diagram illustrating example image data applied to different areas of a display panel to mitigate crosstalk in accordance with an embodiment.

FIG. 4C depicts an example of the image displayed in non-active area 420 in response to the image displayed in the active area 410 in accordance with an embodiment. For example, for columns of the active area 410 corresponding to only white background (e.g., left and right of the black square), the inverted column signal is at a low level luminance. Thus, the pixels in the corresponding columns in the non-active area 420 are driven by compensation content that is at a low level luminance. For columns of the active area which include the black square, the inverted column signal includes high level luminance or bright pixels. Thus, the compensation content for corresponding columns in the non-active area 420 includes high level luminance or bright pixels, based on a portion of the inverted column signal. Therefore, the column of the non-active area 420 is driven with a portion corresponding to the inverted column signal to counteract the crosstalk in the active area 410.

Figure 4D:
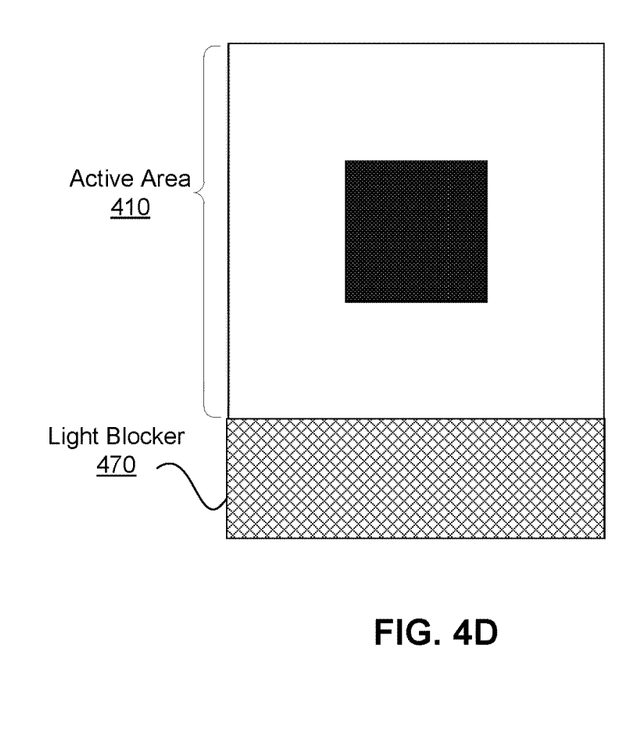
FIG. 4D is a diagram illustrating a light blocker with a display panel to mitigate crosstalk in accordance with an embodiment.

FIG. 4D depicts a light blocker 470 that covers the emissive area of the non-active area 420 in accordance with an embodiment. For example, light blocker 470 may be an eyecup of the headset or some other object that covers light generated by the non-active area 420 which should not be visible to the user of the headset.

While embodiment shown in FIGS. 4A, 4C and 4D show the non-active area 420 or light blocker 470 as appearing below the active area 410 of the display panel in a vertical direction and correcting for crosstalk in the column direction, the non-active area 420 may appear on any side of the active area 410 of the display panel and be used for mitigating crosstalk in the row or column direction.

Software for Mitigating Crosstalk of a Display Panel in a HMD

In one embodiment, the mitigation of crosstalk can be done in software. A calibration system (VR console 110 or a system separate from the VR console 110) can perform a calibration step using a calibration camera on a display panel (e.g., electronic display 115 of VR headset 105) to collect multiple images of specific patterns that contain information about the crosstalk. The calibration system uses the multiple images to determine crosstalk as a function of row and column of the display panel. This function can be used by the VR console 110 to mitigate crosstalk in a display panel of the HMD. The VR console 110 may perform the rendering step for the HMD. During the rendering step, the VR console 110 has the content to be displayed (desired image) on the display panel. The VR console 110 may perform corrections on the content such as distortion and chromatic aberration. The VR console 110 performs panel correction once other corrections on the content may have been performed. During the panel correction, the VR console 110 may apply uniformity correction as an overall low frequency variation in brightness and color and as a mura correction for pixel-to-pixel variation of the display panel. As part of the panel correction, the VR console 110 predicts the crosstalk of the content to be displayed on the display panel based on the previous calibration of the display panel and applies a correction for the predicted crosstalk. The correction for the predicted crosstalk may be based on function of the content to be displayed (entire image) and may be based on a sum or weighted sum of rows or columns of the content. To correct for predicted crosstalk, the VR console 110 generates a rendered image, making some areas darker or brighter than ideal image to produce an actual image closer to the desired image.

Figure 5:
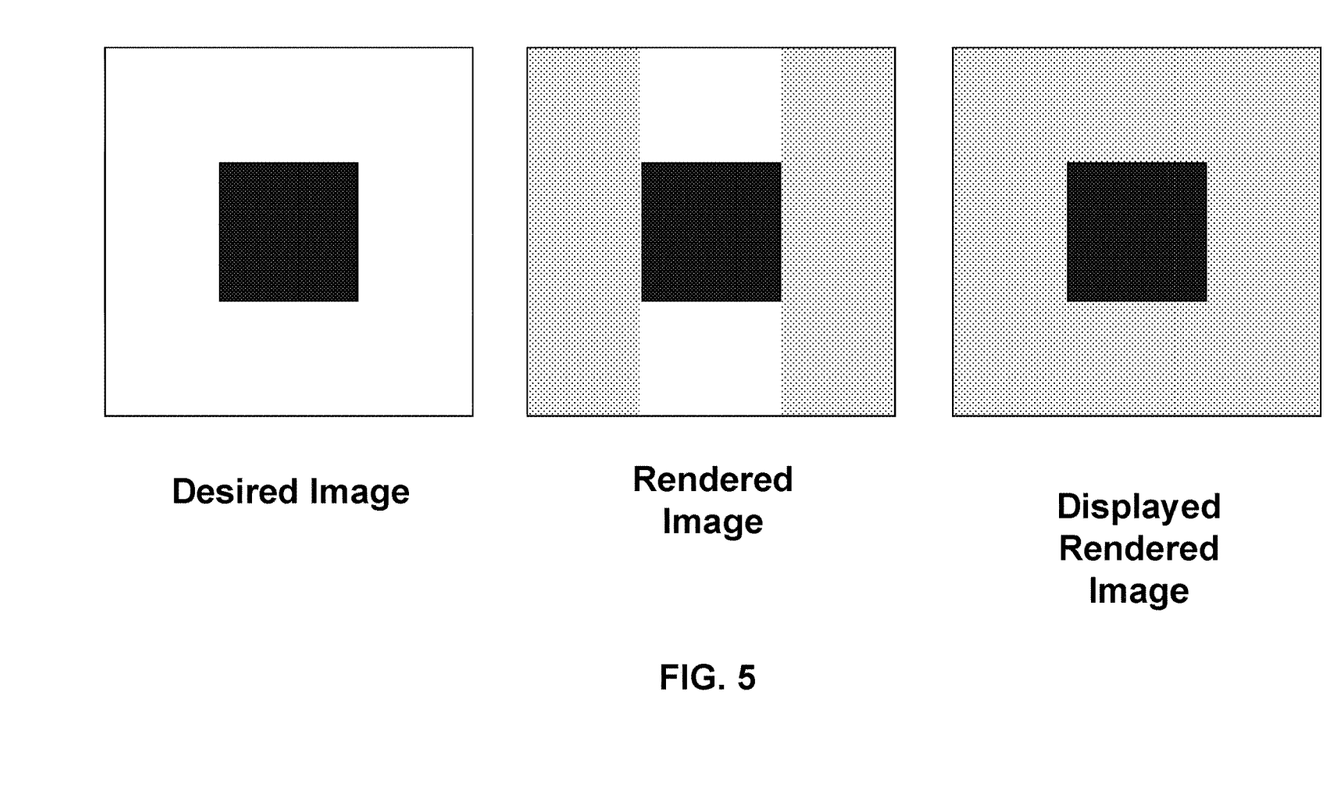
FIG. 5 is a diagram illustrating the desired, rendered and displayed rendered images of a display panel using software implementation to reduce crosstalk in accordance with an embodiment.

FIG. 5 is a diagram illustrating the desired, rendered, and displayed rendered image of a display panel using software implementation to reduce crosstalk in accordance with an embodiment. The desired image to be displayed on the display panel of the HMD may be a dark or black square in the center of a white background. The rendered image, determined by the VR console 110, is a black square with column areas adjacent to the black square as a dimmed white. The displayed rendered image becomes a black square on a dimmed white background. The displayed rendered image is improved over the actual image of FIG. 3, because the black square appears to be on a uniform white (albeit dimmer) background in FIG. 5.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head mounted display (HMD) comprising:
a display panel comprising:
a first portion including an active area of the display panel; and
a second portion of the display panel, wherein the second portion of the display panel is electrically coupled to the first portion of the display panel; and
the display panel is configured to receive content and compensation content from a virtual reality (VR) console for driving the first portion and the second portion of the display panel, respectively, wherein the VR console is configured to:
generate the compensation content for the second portion of the display panel, wherein the compensation content is based on modification of the content to be displayed on the first portion of the display panel to mitigate crosstalk in the first portion of the display panel; and
provide the content and the compensation content for driving the first portion and the second portion, respectively, of the display panel to the display panel of the HMD.

2. The HMD of claim 1, wherein the HMD further comprises a blocking object to prevent light generated from the second portion of the display panel from reaching an eye of a user wearing the HMD.

3. The HMD of claim 1, wherein the second portion of the display panel comprises electronic circuit elements to drive a plurality of pixels in the second portion of the display panel that do not emit light.

4. The HMD of claim 1, wherein the second portion of the display panel comprises aggregate electronic circuit elements to simulate a plurality of electronic circuit elements to drive a plurality of pixels in the second portion of the display panel that do not emit light, wherein each one of the aggregate electronic circuit elements is configured to drive a corresponding row or column of the plurality of pixels in the second portion of the display area.

5. The HMD of claim 1, wherein the second portion of the display panel is electrically coupled to the first portion of the display panel in a column direction, and the VR console configured to generate the compensation content is configured to invert luminance of each column of the content to be displayed on the first portion of the display panel.

6. The HMD of claim 1, wherein the second portion of the display panel is electrically coupled to the first portion of the display panel in a column direction, wherein the VR console configured to generate the compensation content is configured to sum a luminance of each column of the content to be displayed on the first portion of the display panel and invert the sum.

7. The HMD of claim 1, wherein the second portion of the display panel is electrically coupled to the first portion of the display panel in a row direction, and the VR console configured to generate the compensation content is configured to invert luminance of each row of the content to be displayed on the first portion of the display panel.

8. The HMD of claim 1, wherein the second portion of the display panel is electrically coupled to the first portion of the display panel in a row direction, wherein the VR console configured to generate the compensation content is configured to sum a luminance of each row of the content to be displayed on the first portion of the display panel and invert the sum.

9. A method of driving a display panel of a head mounted display (HMD) comprising:
   generating compensation content for a second portion of the display panel, wherein the compensation content is based on modification of content to be displayed on a first portion of the display panel to mitigate crosstalk in the first portion of the display panel; and
   providing the content and the compensation content for driving the first portion and the second portion, respectively, of the display panel to the display panel of the HMD.

10. The method of claim 9, wherein the generating compensation content further comprises, for each column of the content to be displayed on the first portion of the display panel, inverting luminance of the content.

11. The method of claim 9, wherein the generating compensation content further comprises, for each column of the content to be displayed on the first portion of the display panel, summing a luminance of the content and inverting the sum.

12. The method of claim 9, wherein the generating compensation content further comprises, for each row of the content to be displayed on the first portion of the display panel, inverting luminance of the content.

13. The method of claim 9, wherein the generating compensation content further comprises, for each row of the content to be displayed on the first portion of the display panel, summing a luminance of the content and inverting the sum.

* * * * *